United States Patent [19]

Schaefgen

[11] 4,075,262

[45] Feb. 21, 1978

[54] COPOLYESTERS CAPABLE OF FORMING AN ANISOTROPIC MELT

[75] Inventor: John Raymond Schaefgen, Wilmington, Del.

[73] Assignee: E. I. Du Pont de Nemours and Company, Wilmington, Del.

[21] Appl. No.: 752,996

[22] Filed: Dec. 21, 1976

Related U.S. Application Data

[63] Continuation-in-part of Ser. No. 604,073, Aug. 12, 1975, abandoned, which is a continuation-in-part of Ser. No. 468,696, May 10, 1974, abandoned.

[51] Int. Cl.² .............................................. C08L 67/02
[52] U.S. Cl. ................................... 260/860; 260/47 C
[58] Field of Search .............................. 260/47 C, 860

[56] References Cited

U.S. PATENT DOCUMENTS

| 3,037,960 | 6/1962 | Frazer | 260/860 |
| 3,160,603 | 12/1964 | Holub | 260/47 C |

*Primary Examiner*—Paul R. Michl

[57] ABSTRACT

This invention relates to a class of novel fiberforming, melt spinnable copolyesters capable of forming an anisotropic melt, said copolyester consisting essentially of units of the formula

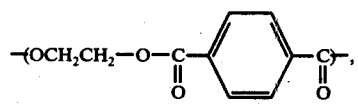

I

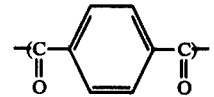

II

III wherein units II and III are present in substantially equimolar amounts; Ar is selected from the group of chloro-, methyl-, 2,6-dichloro-, 2,6-dimethyl-1,4-phenylene or chloro-4,4'-biphenylene radicals; the copolyester containing from 15-70% by weight of unit I, and to the fibers and other shaped articles prepared therefrom. Also comprehended by this invention are the novel, optically anisotropic polyester melts from which these shaped articles can be prepared.

10 Claims, 1 Drawing Figure

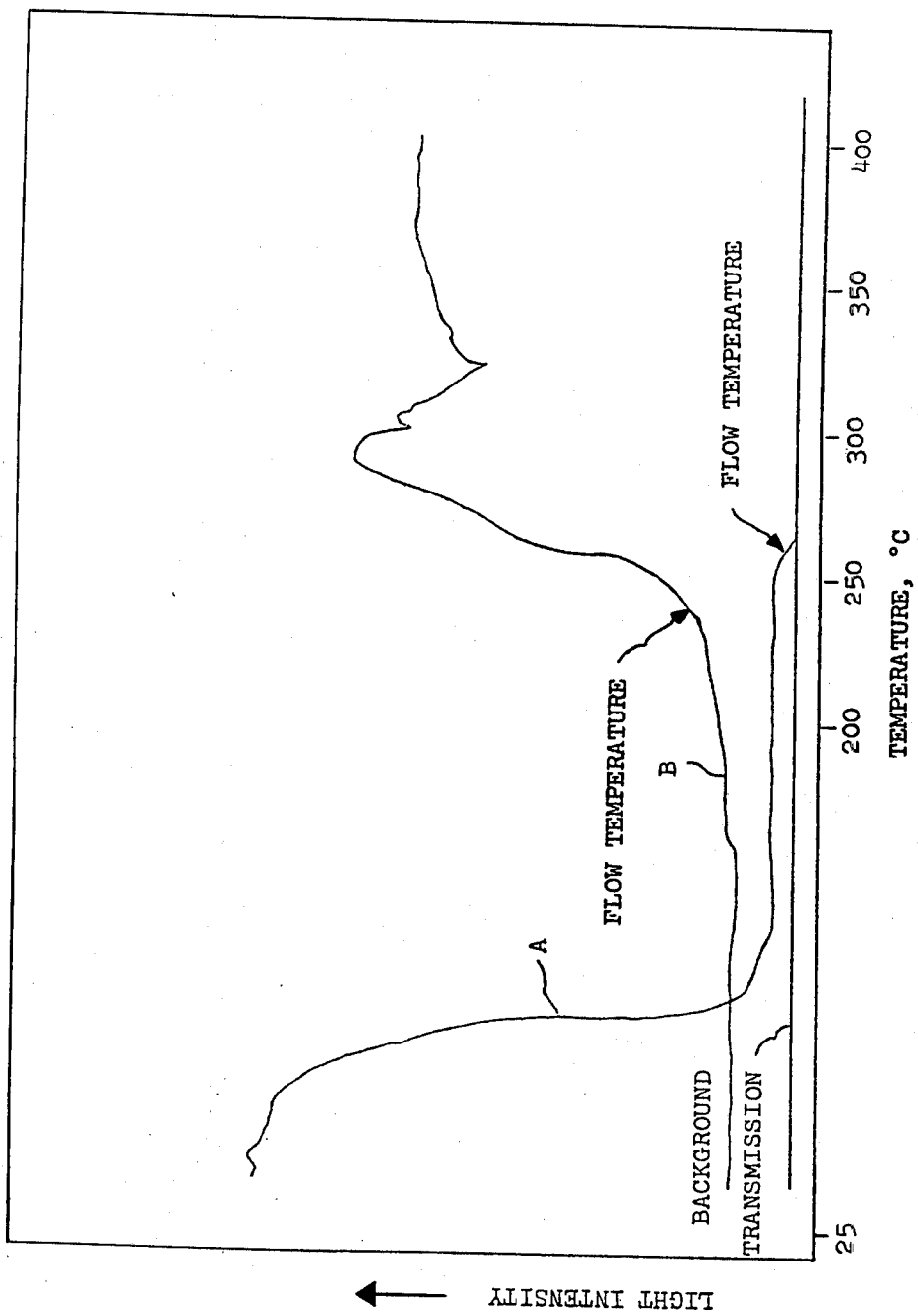

COPOLYESTERS CAPABLE OF FORMING AN ANISOTROPIC MELT

CROSS REFERENCE TO RELATED APPLICATIONS

This application is a continuation-in-part of my copending application Ser. No. 604,073 filed Aug. 12, 1975, now abandoned which is a continuation-in-part of my application Ser. No. 468,696 filed May 10, 1974 and now abandoned.

BACKGROUND OF THE INVENTION

While numerous other polyesters have been prepared and evaluated, polyethylene terephthalate continues to be the singularly preferred polyester in current commercial use. This species is used to prepare a variety of products including films, textile filaments, tire cords, ropes, and other industrial and consumer products. The development of new polyester having certain advantages over polyethylene terephthalate has been a worthwhile objective.

SUMMARY OF THE INVENTION

This invention provides novel, melt-spinnable anisotropic melt-forming copolyesters of fiber-forming molecular weight consisting essentially of units of the formula

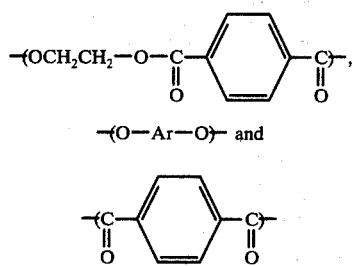

wherein units II and III are present in substantially equimolar amounts; Ar is selected from the group of chloro-, methyl-, 2,6-dichloro-, 2,6-dimethyl-1,4-phenylene or chloro-4,4'-biphenylene radicals; the copolyester containing from 15–70% by weight of unit I.

Illustrative copolyesters of the invention are copoly(ethylene terephthalate/chloro-1,4-phenylene terephthalate) (15–70% by weight of ethylene terephthalate units); copoly(ethylene terephthalate/methyl-1,4-phenylene terephthalate) (15–70% by weight of ethylene terephthalate units); and copoly(ethylene terephthalate/2,6-dichloro-1,4-phenylene terephthalate) (25–70% by weight of ethylene terephthalate units).

The copolyesters of this invention are of fiberforming molecular weight.

Also comprehended by this invention are optically anisotropic melts and shaped articles obtained from the copolyesters comprising the above-described units. In particular, the fibers obtained by spinning these melts exhibit low shrinkage when heated to 160° C, high orientation, and high initial modulus.

DRAWING

The Figure dipicts light intensity traces obtained as described herein for two different polyesters in the solid and melt states along with the background trace. One of the trace curves is of a polyester yielding an anisotropic melt while the other trace curve is of a polymer which yields an isotropic melt.

DETAILED DESCRIPTION OF THE INVENTION

Precursors

The previously described copolyesters of this invention can be prepared by polymerization techniques where poly(ethylene terephthalate), bis($\beta$-hydroxyethyl)terephthalate or ethylene glycol is reacted with chloro-, methyl-, 2,6-dichloro- or 2,6-dimethylhydroquinone or chloro-4,4'-biphenol or a suitable derivative thereof, e.g., the diacetate, and terephthalic acid. It will be understood of course that a change in precursor and/or varying the proportions of unit I will have an effect on the melting point of the resulting polymer and in some cases on its anisotropic nature as well. Bis($\beta$-hydroxyethyl)terephthalate has been found to be generally more effective than poly(ethylene terephthalate) in lowering the polymer melting point; however, in large amounts, it will tend to result in isotropic rather than optically anisotropic melts. On the other hand, the use of 2,6-dimethyl- or 2,6-dichlorohydroquinone (or derivative thereof) instead of the mono-substituted hydroquinone tends to result in higher melting polyesters.

POLYMERIZATION CONDITIONS

The instant copolyesters may be prepared by melt polymerization techniques, preferably under anhydrous conditions in an inert atmosphere. For example, polyethylene terephthalate (A) having an inherent viscosity of at least about 0.20 is reacted with essentially equimolar amounts of chlorohydroquinone diacetate (B) and terephthalic acid (C) in a mole ratio (A/B+C) of 0.031 to 1.7. Alternatively, bis($\beta$-hydroxyethyl)terephthalate (D) is reacted with the chlorohydroquinone diacetate (B) and terephthalic acid (C) in a mole ratio D/B+C of 0.06 to 0.13. The reactants may be combined in a reaction vessel equipped with a stirrer, nitrogen inlet tube, and combined distillation headcondenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete, as indicated by the amount of acetic acid collected remaining constant; the molten polymer mass is placed under reduced pressure (e.g., 1 mm, Hg or less) and is heated further to facilitate removal of the remaining acetic acid and to complete the polymerization. The melt may then be removed, cooled, and allowed to solidify prior to purification and/or subsequent processing. Optionally, the molten polymer may be transferred directly to an appropriate apparatus for preparation of shaped articles, e.g., a fiber spinning unit.

For smaller scale syntheses, e.g., in a polymer melt tube, agitation may be accomplished by passing a stream of inert gas through the melt. However, mechanical stirring is preferred.

Polymerization conditions may be varied according to, e.g., the reactants employed, and the degree of polymerization desired.

ANISOTROPIC MELTS

The anisotropy of these copolymers in the molten state facilitates attainment of high orientation, high strength, high initial modulus, and/or low shrinkage in fibers prepared from the melts.

Optical anisotropy of the copolyester melts can be determined by modification of known procedures. It is well known that translucent optically anisotropic materials cause light to be transmitted in optical systems equipped with crossed polarizers [see, e.g., S. A. Jabarin and R. S. Stein, J. Phys. Chem. 77, 399 (1973)], whereas transmission of light is theoretically zero for isotropic materials. Thus, optical anisotropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermooptical test (TOT) described below. The apparatus is similar to that described by I. Kirshenbaum, R. B. Isaacson, and W. C. Feist, Polymer Letters, 2, 897–901 (1964).

SHAPED ARTICLE PREPARATION

The copolyesters of this invention are formed into useful shaped articles such as fibers, films, bars, or other molded objects, etc, by, e.g., pressing or by spinning, casting, or extruding the anisotropic melts thereof. Especially preferred are the highly oriented, strong fibers. For fiber preparation the molten polymer mass, obtained either directly from the melt polymerization of the polymer-forming ingredients or via the melting of a plug or block of polymer, is processed, e.g., through a melt spinning unit and extruded through a spinneret into a quenching atmosphere (e.g., air maintained at room temperature) and wound up. As used herein, the term "as-spun fiber" refers to a fiber which has not been drawn, stretched, or heat treated after extrusion and normal windup. In fact, the "as-spun" fibers of the anisotropic melts cannot be drawn in the usual sense, i.e., 100% or more.

Fibers may be prepared conveniently from single or multi-hole spinnerets. In the melt spinning cell, the melt zone temperature will be in the range of, e.g., from about 240° to 375° C, depending on the sample. Higher temperatures are used for samples exhibiting higher inherent viscosities or higher flow temperatures. Temperatures preferably are maintained above the flow temperture but, under pressure, fibers can be spun somewhat below the flow temperature since the latter is measured at essentially zero shear. Similarly, spinneret temperatures will be in the range of, e.g., from about 250° C to 375° C depending on the melt zone temperature and the copolymer system. Filtering screens may be employed in the spinneret pack. Air is preferred as a quenching medium for the fibers leaving the spinneret. The as-spun fibers may be wound up at speeds in the range of, e.g., from less than 100 m/min to 1,750 m/min or higher. If desired, a finish may be applied to the as-spun fibers.

For small quantities of material, a convenient method for demonstrating fiber-forming potential of these compositions is to melt a chip of polymer in the anisotropic melt-forming temperature range on a heated bar (e.g., a modified Dennis bar, see Sorenson, W. and Campbell, T. W. "preparative Methods of Polymer Chemistry," Interscience Publishers, Inc., New York, 1961, p. 49–50), and slowly (~1 ft/sec) withdraw fibers from the melted pool. Such fibers usually are highly oriented and strong in contrast to fibers made from poly(ethylene terephthalate), a known melt spinnable polyester, by the same method.

Films may be prepared by conventional melt-pressing techniques. Exceptionally tough bars may be prepared by injection molding. Thus a bar ($\frac{1}{8}$ in. × $\frac{1}{2}$ in. × 5 in.) of desirable physical properties was prepared by injection molding copoly(ethylene terephthalate/chloro-1,4-phenylene terephthalate)(27/73 by wt.) $\eta_{inh} = 0.82$ (Method 2) under these conditions: cylinder temperature = 310° C, mold at room temperature and pressure sufficient to fill mold without excessive flash. The relatively low viscosity of the melts is an advantage in processing.

It is preferred that the polyesters have a flow temperature within the range of 200° C to 375° C. Polyesters with flow temperatures in excess of 375° C are difficult to process (e.g., spin into useful fibers). Depending on structure, rapid decomposition of the polyesters may occur at higher temperatures, i.e., above 375° C.

Plasticizers may be used to assist in the formation of shaped articles from those polyesters which exhibit high melting point and/or high values of inherent viscosity.

FIBERS, FILMS, BARS: PROPERTIES, HEAT TREATMENT, UTILITY

The as-spun fibers of this invention are characterized by a tenacity of at least 1 gpd., an initial modulus in excess of about 150 gpd. (and often exceeding 200 gpd.), and an X-ray orientation angle of less than about 35°. The low shrinkage properties of these fibers favor their use in dimensionally stable fabrics. Other uses are in, e.g., papers, ropes, tire cords, and fiber-reinforced plastics. The fibers may be heat-treated, often increasing considerably in tenacity.

Fiber samples as skeins or on bobbins may be heated in an inert atmosphere (e.g., in nitrogen or in vacuo) under a variety of conditions. Heating is normally conducted for about 1 to 12 hours or longer at a maximum temperature approaching the fusion point of the filaments. It is preferred that the maximum temperature be reached in a stepwise or a slow continuous fashion.

When the fiber samples are wound on bobbins, it is preferred that a soft, yielding surface be present on the bobbin, e.g., a covering of Fiberfrax ® (batted ceramic insulation of the Carborundum Company). The inert atmosphere within the oven or other heat-treating chamber is changed during the treating period by causing a flow of the inert gas (e.g., nitrogen) to enter and to leave the oven at a rate sufficient to remove by-products from the vicinity of the fiber.

MEASUREMENTS AND TESTS

X-Ray Orientation Angle

The orientation angle (O.A.) values reported herein are obtained by the procedures described in Kwolek U.S. Pat. No. 3,671,542, using Method Two of that patent. For fibers of this invention, the arc used for orientation angle determination occurs at about 16° to 20° for $2\theta$. In the examples a specific $2\theta$ value is shown parenthetically after the O.A. value.

INHERENT VISCOSITY

Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.5 gram of the polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C; the solvent is a mixture of trifluoroacetic acid/methylene chloride (60/40, V/V, Method 1) or is symdichlorotetrafluoroacetone hydrate (Method 2). The inherent viscosity determinations of the poly(ethylene terephthalate) is made by Method 1.

FIBER TENSILE PROPERTIES

Filament and yarn properties are measured by the procedure shown in Blades U.S. Pat. No. 3,869,429. Tenacity, T, and Modulus, Mi, are given in grams per denier. Elongation, E, is given in percent. At least three breaks are averaged.

It should be noted that different values are obtained from single filaments (filament properties) and from multifilament strands (yarn properties) of the same sample. Unless specified otherwise all properties given herein are filament properties.

OPTICAL ANISOTROPY

Optical Anisotropy may be measured by the TOT method shown herein.

TOT and FLOW TEMPERATURE APPARATUS AND METHOD

The thermo-optical test (TOT) requries a polarizing microscope which should have strain-free optics and sufficiently high extinction with crossed (90° polarizers to be capable of giving a background transmission specified below. A Leitz Dialux-Pol microscope was used for the determinations reported herein. It was equipped with Polaroid polarizers, binocular eyepieces, and a heating stage. A photodetector (a photometer sensor) was attached at the top of the microscope barrel. The microscope had a 32X, long working distance objective, and a Red I plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slider permits transferring the image from eyepieces to photodetector. The heating stage used is one capable of being heated to 500° C. A "Unitron" model MHS vacuum heating stage (Unitron Instrument Co., 66 Needham St., Newton Highlands, Massachusetts 02161) was used. The photodector signal is amplified by a photometer amplifier and fed to the Y-axis of an X-Y recorder. The system response to light intensity should be linear and the error of measurement within ± 1 mm. on the chart paper. The heating stage is provided with two attached thermocouples. One is connected to the X-axis of the X-Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polaroid analyzer of the microscope is removed from the optical path, the slider is shifted to transfer the image to the photodetector and the system is adjusted so that full-scale deflection (18 cm. on the chart paper used) on the Y-axis of the X-Y recorder corresponds to 36% of the photometer signal. This is done by (1) adjusting the light source intensity so that the photometer meter reads a value preselected so that it corresponds to a Y-axis reading on the recorder of 5 cm; (2) increasing the amplification of the photometer by a factor of 10. This results in the full scale recorder deflection of 18 cm corresponding to (18/50) X 100 or 36% of the photometer signal. The background transmission value is recorded with crossed (90°) polarizers and with the cover slip(s), but not the sample, in the optical path. The background transmission in the system used should be independent of temperature and should be less than about 0.5 cm. on the chart paper.

The sample is preferably a 5 $\mu$m. section microtomed with a diamond knife from a solid well-coalesced chip of pure polymer (e.g., as prepared in the examples, or by melting and coalescing under nitrogen some of the ground polymer) mounted in epoxy resin. For materials that shatter when microtomed, duplicate films (about 5 $\mu$m. thick) of polymer are prepared by heating a few particles of pure polymer between each of two sets of cover slips enclosed between a pair of microscope slides. By heating this assembly quickly above the flow temperature (independently determined on a polymer particle) and applying pressure with a wooden tamp alternately over each sample, thin liquid films of polymer are produced. These films solidify when cooled. One solid film between cover slips is used for the TOT procedure; the other is used for a flow temperature measurement.

The sample section is pressed flat between cover slips. One cover slip is removed and the sample on the remaining cover slip is placed (glass down) on the heating stage. The light intensity is set and the background transmission is measured as described above. The sample (section, or film between cover slips) then is positioned so that essentially all the light intercepted by the photodetector will pass through the sample. With the sample between crossed (90°) polarizers and under nitrogen, the light intensity and temperature are recorded on the X-Y recorder as the temperature is raised at a programmed rate of about 14°C/min. from 25° to 450° C. The sample temperature is obtained from the recorded temperature by use of a suitable calibration curve.

The flow temperature of polymers or fibers is observed visually between crossed (90°) polarizers on the heating stage assembly previously described for the TOT procedure. Fiber samples for examination are prepared by cutting the fiber witha razor blade and mounting the samples on a cover slip. Flow temperature is that temperature at which the sharp edges of a tiny chip or particle of polymer or the cut fiber edge become rounded. If the melt viscosity is low enough, flow is observed. When a film is used in the TOT procedure, a duplicate film is used for the flow temperature determination. Flow temperature is that temperature at which the film edges change contour of the polymer flows. Observations are made at a heating rate of 14°C/min.

INTENSITY TRACES

The melt-forming polymers useful for fibers in this invention are considered to form anisotropic melts according to the thermooptical test (TOT) if, as a sample is heated between crossed (90°) polarizes to temperatures above its flow temperature, the intensity of the light transmitted through the resulting anisotropic melt gives a trace whose height (1) is at least twice the height of the background transmission trace on the recorder chart and is at least 0.5 cm greater than the background transmission trace, or (2) increases to such values. Curve B of the FIGURE illustrates a type of intensity trace usually obtained for systems forming anisotropic melts.

The intensity of light transmitted through the analyzer when isotropic melts (the sample should be completely melted) are placed between crossed (90°) polarizers is essentially that of the background transmission (that obtained when the sample but not the cover slip is outside the field of view with 90° crossed polarizers). As the melt forms, the intensity of the light transmission (1) is essentially that of the background transmission or (2) decreases to such values from a higher value. Curve A of the FIGURE illustrates an intensity trace of a polymer forming an isotropic melt.

In Example 1 which follows, the polymer reactor employed consists of a 14-inch (36 cm.) long, 45 mm. OD polymer tube having a ground glass joint at the top to receive a bushing for inserting a stirrer. Near its top the tube has a gas inlet port and a sidearm (ground joint) to which a condenser may be fitted. A stainless steel paddle stirrer is employed.

EXAMPLE 1

This example illustrates the preparation of copoly (ethylene terephthalate/chloro-1,4-phenylene terephthalate) (41/59% by weight) which exhibits melt anisotropy and forms strong fibers.

In a polymer tube are combined poly(ethylene terephthalate) (28.8 g., 0.15 mole, $\eta_{inh}$ = 0.95), chlorohydroquinone diacetate (34.4 g., 0.15 mole), and terephthalic acid (24.9 g., 0.15 mole). The stirred ingredients, under nitrogen, are heated in a 100° C. vapor bath for 15 minutes, then allowed to cool. They are then heated (under nitrogen) in a 283° vapor bath for 1 hour 50 minutes; the by-product acetic acid is collected. The nitrogen bleed is removed and the reactants are heated at 283°C/3-⅓ hours under reduced pressure of 2.0-0.20 mm. Hg. The yield of copolymer is 55.9 g., $\eta_{inh}$ = 0.78 (Method 2). The copolymer flows at 230° C and exhibits anisotropy above that temperature (TOT).

The copolymer is spun through a 5-hole spinderet at 252° C. The hole diameter is 0.018 cm, and the wind-up speed is 139 m/min.

A melt-spun fiber exhibits T/E/Mi = 4.1/2.4/283 and a denier/filament of 17; O.A. = 19° (19.1°).

EXAMPLE 2

This example illustrates the preparation of copoly (ethylene terephthalate/methyl-1,4-phenylene terephthalate) (43/57% by weight) which exhibits melt anisotropy and formation of fibers thereof.

In a polymer tube are combined poly(ethylene terephthalate) (8.64 g., 0.045 mole, $\eta_{inh}$ = 1.16), methylhydroquinone diacetate (9.36 g., 0.045 mole) and terephthalic acid (7.47 g., 0.045 mole). The mixed ingredients, under nitrogen, are heated in a 100° C vapor bath for 15 minutes, then allowed to cool. They are then heated with stirring (under nitrogen) in a 283° C vapor bath for 1 hour 50 minutes and subsequently cooled; the by-product acetic acid is collected. The nitrogen flow and stirring are stopped and the reactants are heated at 283° C for 3⅓ hours under reduced pressure of 0.5-0.2 mm. Hg., allowed to cool for 2¼ hours under reduced pressure, and subsequently heated at 255° C for 16 hours under a reduced pressure of 0.20 to 0.15 mm. Hg. The yield of copolymer is 15 g. $\eta_{inh}$ = 0.57 (Method 2). The copolymer flows at 238° C and exhibits anisotropy above that temperature (TOT).

The copolymer is spun through a 1-hole spinneret at 276°-280° C. The hole diameter is 0.023 cm., and the windup speed is 572 m/min.

A melt-spun lustrous fiber exhibits T/E/Mi = 2.4/1.0/239 and a denier/filament of 6.4; O.A. = 27° (18.7°).

EXAMPLE 3

This example illustrates preparation of copoly (ethylene terephthalate/methyl-1,4phenylene terephthalate) (16/84% by weight) and strong fibers thereof.

In a polymer tube are combined bis(beta-hydroxyethyl)terephthalate (2.54 g., 0.01 mole), terephthalic acid (14.95 g., 0.09 mole), and antimony trioxide (0.0015 g.). The tube is evacuated and filled with nitrogen (2X). The contents of the tube, stirred and under a nitrogen sweep, are heated for about 1 hour at 283° C. The nitrogen flow is halted and the stirred reaction system is placed under vacuum for about 1 min. After the vacuum is released, stirring is stopped and the system is allowed to cool. Methylhydroquinone diacetate (17.49 g., 0.084 mole, 5% excess) to provide for losses due to volatilization during polymerization) is added and the tube again is evacuated and filled with nitrogen (2X). The contents of the tube, again stirred under nitrogen, are heated at 283° C for about 2¼ hours; the distillate by-product is collected. The nitrogen flow is halted and the system placed under reduced pressure - reaches 2.0 mm Hg. in about 5 min. After being heated (283° C.) and stirred under vacuum (2.0 - 0.3 mm Hg) for about 1 hour, the reaction system becomes unstirrable, The reactants are cooled briefly, after which the temperature is then raised to 305° C. in a few minutes, whereupon the stirring is again accomplished; pressure is 0.25 mm Hg. These conditions are maintained for another 25 minutes, after which the reaction system again solidifies and becomes unstirrable. Heating and reduced pressure (0.25 - 1.8 mm Hg) are maintained for another 85 minutes, after which the system is allowed to cool and the product is isolated; the yield is 16.0 g. The copolymer flows at 338° C and exhibits optical anisotropy above that temperature (TOT).

A plug of this copolymer is spun through a 1-hole spinneret (hole diameter = 0.023 cm.) at 349° C.; filament wind-up speed is 549 m/min. The filament exhibits T/E/Mi/Den. = 2.5/0.7/387/3.6; O.A. = 13° (19.4°).

Samples of the as-spun filament are placed in a wire basket and heated in an oven, under a nitrogen flow, under these successive conditions: room temperature to 220° C/18 min.; 220°-222° C/60 min.; 220°-250° C/8 min.; 250°-253° C/61 min.; 253°-280° C/24 min.; 280° C/16 hr. The oven is turned off and the fibers allowed to cool therein for 70 minutes before being removed.

The heat treated fiber exhibits T/E/Mi/Den. = 9.6/2.2/455/4.5.

EXAMPLE 4

This example illustrates preparation of copoly (ethylene terephthalate/chloro-1,4-phenylene terephthalate (15/85% by weight) and strong fibers.

The procedure of Example 3 is repeated through the first heating stage. To the cooled reactants is added chlorohydroquinone diacetate (19.2 g., 0.084 mole, 5% excess) in place of the methyl-substituted analog of Ex. 3, followed by evacuation and by filling of the tube with nitrogen. The reactants are than heated and stirred, under nitrogen, at 283° C. for about 1⅔ hr. Then the system is placed under reduced pressure reaching about 1 mm Hg. in 3 min. The stirred, evacuated system is heated at 283° C. for about 27 min. more, at which time the contents of the tube solidify (pressure = 0.25 mm Hg). Heating (without stirring) is continued for 17 min. The reactants are cooled briefly, after which the temperature is then raised to 305° C. in a few minutes and is maintained thereat for 20 min. at 0.2 mm Hg. pressure. The reactants are again cooled briefly, after which the temperature is then raised to 323° C. in 5 min. (pressure = 0.2 mm Hg) and maintained thereat for 15 min. The reaction system is allowed to cool and the product isolated. Yield is 18.1 g. The copolymer flows at 333° C. and exhibits optical anisotropy above that temperature (TOT). The plug of this copolymer is spun (at 346° C.) through a spinneret and wound up as in Example 3. The filament exhibits T/E/Mi/Den. = 2.1/0.70/342/7.8; O.A. = 15° (18.3°).

Fiber samples are heat treated as in Example 3 under these successive conditions: room temperature to 200° C./0.5 hr., 200° C./1 hr.; 220° C./1 hr., 240° C./1 hr., 260° C./52 min., and 280° C./16 hr. The time to go to each higher temperature from the preceding one is 2-5 min. The heat treated fibers exhibit T/E/Mi/Den. = 11.1/3.4/378/6.3.

EXAMPLE 5

This example illustrates preparation of copoly (ethylene terephthalate/2,6-dimethyl-1,4-phenylene terephthalate) (28/72% by weight) from which strong fibers are prepared.

The procedure of Example 3 is repeated through the first heating stage, with the initial charge being bis(-betahydroxyethyl) terephthalate (2.54 g., 0.01 mole), terephthalic acid (7.81 g., 0.047 mole), and antimony trioxide (0.0015 g). To the cooled reactants is added 2,6-dimethylhydroquinone diacetate (8.67 g., 0.039 mole, 5% excess) after which the polymer tube is evacuated and refilled with nitrogen. The stirred reaction mixture is heated under nitrogen at 283° C. for 2 hr., cooled briefly (2-3 min.), then heated and stirred at 305° C. under nitrogen for 1 hour, 28 min. The system is then placed under vacuum at 305° C. for about 23 minutes (0.9 mm Hg pressure at the end of this time). Occasional stirring is now done by hand as the temperature is maintained at 305° C. for 41 min. (pressure reaches 0.25 mm Hg). The reaction mixture is allowed to cool and about 7 g of product is obtained. The copolymer flows at 371° C. and exhibits optical anisotropy above that temperature (TOT). The copolymer is stored a few days, then heated at 283° C./0.3-0.15 mm Hg for 16 hr. 10 min. A plug of this product is spun and wound up (spinneret temperature = 370° C, wind-up speed = 457 m/min.).

The filament exhibits T/E/Mi/Den = 3.3/2.2/242/4.9; O.A. = 31° (16.9°).

EXAMPLE 6

This example illustrates preparation of copoly (ethylene terephthalate/chloro-4,4'-biphenylene terephthalate) (19/81% by weight) and strong fibers thereof.

The procedure of Example 3 is repeated through the first heating stage, with the initial charge being bis(-betahydroxyethyl) terephthalate (2.72 g., 0.0107 mole), terephthalic acid (10.10 g., 0.0608 mole), and antimony trioxide (0.0025 g.). To the cooled reactants is added 4,4'-diacetylchlorobiphenyl (15.86 g., 0.052 mole, 4% excess), after which the polymer tube is evacuated and refilled with nitrogen. The stirred reaction mixture is heated under nitrogen at 283° C. for 1 hr. 20 min. The nitrogen flow is halted and the stirred system placed under reduced pressure at 283° C. (2.5 mm Hg). Within 3 min., the pressure reaches 1.9 mm Hg, and within 2 min. more, 1.2 mm Hg. Heating and stirring under reduced pressure are continued for about 3⅔ hr. (pressure reaches 0.1 mm Hg). The product is cooled under nitrogen, collected, broken up in small pieces, and heated at 255° C. for 16 hr. under 0.4 mm Hg pressure. The yield is 14.5 g. The flow temperature is 298° C. and the copolymer melt is optically anisotropic (TOT).

A plug of this product is spun and wound up (with some filament breakage) (spinneret temperature = 360° C.). For the filament, T/E/Mi/Den. = 3.7/0.8/525/5.6; O.A. = 17° (19.6°).

The 4,4'-diacetylchlorobiphenyl is prepared by combining 4,4'-dihydroxybiphenyl (18.62 g., 0.10 mole) with 600 ml. of glacial acetic acid in a 1-liter, 3-neck flask fitted with a stirrer, nitrogen inlet tube, and a watercooled condenser topped with a second condenser (cooled by solid carbon dioxide) whose outlet is connected to a bubbler tube. The mixture is heated and stirred under nitrogen to form a solution which is then slightly cooled. Liquid chlorine (5 ml; liquified by solid carbon dioxide cooling) is allowed to evaporate and is passed into the stirred mixture in a stream of nitrogen. The reaction proceeds for about 0.5 hr. after addition of the chlorine, then is cooled. The contents of the flask are boiled down to about 100 ml. volume, then added to about 1,200 ml. of distilled water and the mixture cooled in ice water. The precipitated product is successively collected, dried in a vacuum oven for 3 hr. at 100° C. (wt. = 18.4 g.), added to a mixture of acetic anhydride (55.2 ml.) and sulfuric acid (1 drop). The solution formed is refluxed for 30 min., then combined with 600 ml. of distilled water. The crystallized product (24.4 g.) is recrystallized from 2B alcohol (450 ml.), collected, and dried in a vacuum oven. For the recrystallized material, m.p. = 125°-127° C., % Cl = 10.8% (theory = 11.6%, calc. for $C_{16}H_{13}ClO_4$).

What is claimed is:

1. A fiber-forming melt spinnable copolyester capable of forming an anisotropic melt and consisting essentially of units of the formula:

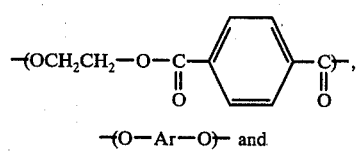

I

—(O—Ar—O)— and

II

-continued

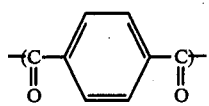
III wherein units II and III are present in substantially equimolar amounts; Ar is selected from the group of chloro-, methyl-, 2,6-dichloro-, 2,6-dimethyl-1,4-phenylene, or chloro-4,4'-biphenylene radicals; the copolyester containing from 15–70% by weight of unit I.

2. The polymer of claim 1 wherein Ar is a chloro-1,4-phenylene radical.

3. The polymer of claim 1 wherein Ar is a 2,6-dichloro-1,4-phenylene radical.

4. The polymer of claim 1 wherein Ar is a methyl-1,4-phenylene radical.

5. The polymer of claim 1 wherein Ar is a chloro-4,4'-biphenylene radical.

6. An anisotropic melt of the polymer of claim 1.

7. A shaped article of the polymer of claim 1.

8. A fiber of the polymer of claim 1.

9. An injection molded bar of the polymer of claim 1.

10. An as-spun fiber of the polymer of claim 1 having a tenacity of at least 1 gpd., an initial modulus in excess of 150 gpd., and an X-ray orientation angle of less than about 35°.

* * * * *

UNITED STATES PATENT OFFICE
CERTIFICATE OF CORRECTION

PATENT NO. : 4,075,262
DATED : February 21, 1978
INVENTOR(S) : John Raymond Schaefgen It is certified that error appears in the above-identified patent and that said Letters Patent are hereby corrected as shown below:

Column 7, line 1, "of" should read --or--.

Column 10, line 13, "4,4'-diacetylchlorobiphenyl" should read --4,4'-diacetoxychlorobiphenyl--.

Column 10, line 32, "4,4'-diacetylchlorobiphenyl" should read --4,4'-diacetoxychlorobiphenyl--.

Signed and Sealed this

Fourth Day of December 1979

[SEAL]

Attest:

SIDNEY A. DIAMOND

Attesting Officer

Commissioner of Patents and Trademarks